March 26, 1940.   H. ZIEBOLZ   2,195,351
APPARATUS FOR CONTROLLING PHYSICAL CONDITIONS
Filed Aug. 13, 1937   2 Sheets-Sheet 1

Inventor
Herbert Ziebolz
By  A. D. Adams
Attorney

March 26, 1940.　　　H. ZIEBOLZ　　　2,195,351
APPARATUS FOR CONTROLLING PHYSICAL CONDITIONS
Filed Aug. 13, 1937　　　2 Sheets-Sheet 2
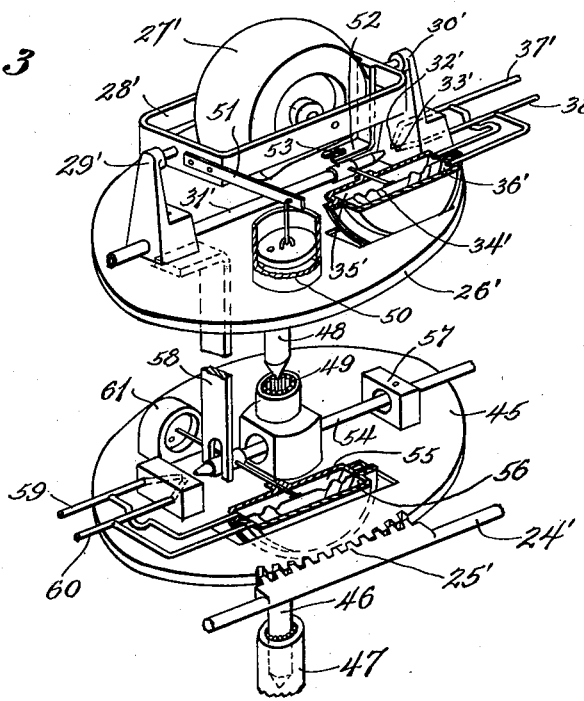
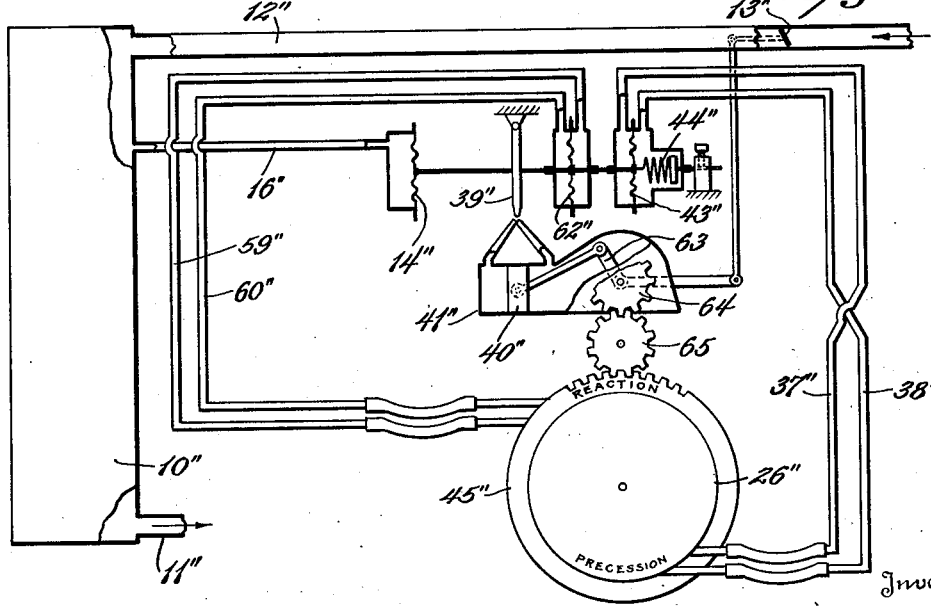
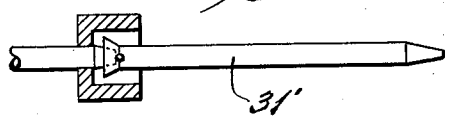
Inventor
Herbert Ziebolz
By A. D. Adams
Attorney Patented Mar. 26, 1940

2,195,351

UNITED STATES PATENT OFFICE 2,195,351

APPARATUS FOR CONTROLLING PHYSICAL CONDITIONS

Herbert Ziebolz, Chicago, Ill., assignor to Askania-Werke A. G., a corporation of Germany Application August 13, 1937, Serial No. 159,013

16 Claims. (Cl. 74—1)

This invention relates to apparatus for controlling physical conditions, such as temperature, pressure, flow, humidity and the like.

Generally, the problem of controlling presents the major difficulty of making adjustments of the condition in exact response to the condition change. Considerable deviation from the predetermined condition value which is to be maintained occurs when the adjustment caused by the control apparatus does not, especially with regard to time, correspond to the deviation from the predetermined value. Considerable inaccuracy, generally known as "hunting" or "overshooting", occurs where the controlled condition follows only slowly, or with a certain inertia, the adjustment made by the control device.

It is therefore an object of this invention to provide a method of stable control which is free from "hunting."

This invention is based on the phenomenon that a gyroscopic precessional force is proportional to the first derivative with regard to time of a rotary movement causing the precession, and further, that the gyroscopic reaction force is proportional to the second derivative with regard to time of the said rotary movement.

A gyroscope, for instance, having two degrees of freedom and a normally horizontal axis, will precess when subjected to a rotary movement about a vertical axis with a force which is proportional to the rate of the said rotary movement. The precession of the gyroscope, on the other hand, will cause the gyroscope to react to the said rotary movement with a reaction torque about the vertical axis which is proportional to the rate of rate of the said rotary movement.

I have found by experience that a control of a condition which responds not only to the condition change but also the rate of change and, in particular instances, further to the rate of rate of change will be free from "hunting" and "overshooting", thereby providing an absolutely stable control. In this way, very delicate control problems which heretofore were very difficult to solve or required very complicated control mechanisms are successfully solved by applying the control method outlined hereinafter.

According to this invention the control method consists in creating a rotary movement which is a function of the condition to be controlled; deriving a gyroscopic precessional or a gyroscopic reactional impulse from said rotary movement; and applying said gyroscopic impulse or impulses for adjusting the condition.

It is a further object of this invention to provide a simple and reliable control apparatus for effecting a stable control.

It is a further object of this invention to provide a control apparatus in which no mechanical follow-up connections between the controlling servo-motor and the controlling relay are required. This is the particular feature, since mechanical follow-up connections, such as lever systems, cable connections and the like have proved unreliable and a source of many errors.

Further aims, objects and advantages of this invention will appear from a consideration of the description which follows with the accompanying drawings, showing for purely illustrative purposes embodiments of this invention.

It is to be understood, however, that the description is not to be taken in a limiting sense, the scope of this invention being defined in the appended claims.

Referring to the drawings:

Fig. 3 is a perspective view, partly in section, of a gyroscopic device used in the apparatus of Fig. 2, one of the shafts being separated from its bearing support;

Fig. 4 is a diagrammatic illustration of a modified form of this invention; and

Fig. 5 is a horizontal sectional view illustrating the pivoted jet pipe mountings shown in Fig. 3.

Figure 1:
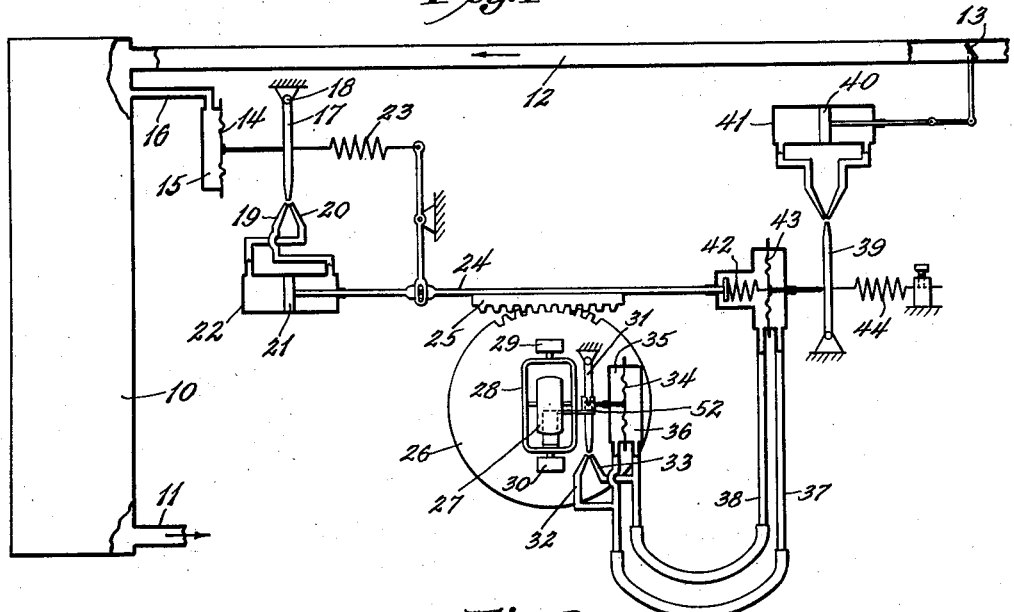
Fig. 1 is a diagrammatic illustration of a control apparatus utilizing one gyroscopic impulse.

For reasons of simplified illustration and explanation the control apparatus in the drawings is applied to a pressure control, such, for example, as the pressure of a fluid flowing through a pipe. The pressure of fluid inside a tank 10 is to be maintained constant, while fluid may be withdrawn through a conduit 11 and the fluid is supplied through a conduit 12 controlled by a control member shown as being a butterfly valve 13. It is to be understood that the condition to be controlled may also be flow, temperature, humidity, speed and the like.

The control problem will be readily understood when it is assumed that in one case air is being withdrawn from the tank 10 to decrease the pressure in the tank by one pound per square inch in one minute, while in another case a quantity of air is withdrawn to reduce the pressure by one pound in ten seconds. It follows that a control apparatus merely responding to the decrease in pressure inside the tank, regardless of the time during which the pressure drop occurs, will open the control member 13 by an equal amount in both instances and, accordingly, admit too much air in the first case or too little in the second to maintain the air pressure substantially constant.

In order to introduce the rate of condition change, in the illustrated example the rate of pressure change, into the control, a gyroscopic precession impulse is used which is created in response to the condition change.

A diaphragm 14 sealing a chamber 15 connected to the tank 10 by means of a conduit 16 responds to the pressure changes and permits a rotary movement to be created from which a gyroscopic impulse is to be derived. In the illustrated example a relay device is used for this purpose. A relay 17 of the well known "Askania" jet-pipe type is pivotally mounted at 18 and supplied with pressure fluid from a source not shown. The jet-pipe issues a jet of pressure fluid into one or the other of reception orifices 19 and 20 for controlling the position of a piston 21 of a servo-motor 22 at the true rate of condition change. The jet-pipe relay is acted upon by the diaphragm 14 and further by means of a spring 23 the tension of which is adjusted according to the movements of the servo-motor piston. When the pressure on the diaphragm 14 rises, the jet-pipe is moved counterclockwisely to register with the reception orifice 20, thereby moving the piston 21 to the right and also causing the tension of the spring 23 to be increased until the jet-pipe is moved into the neutral position. It is easily seen that the position of the piston 21 thus becomes proportional to the pressure inside the tank 10.

The piston 21 is connected to a rod 24 having a rack 25 secured thereto. The rack meshes with the toothed circumference of a rotatable support 26.

The support carries the gyroscope having a gyro rotor 27 mounted for spinning in a rotor bearing member 28, the latter being mounted for precessional movement in bearings 29 and 30. Upon rotation of the support 26, the gyroscope 27 will precess and act upon a relay 31, shown also as being of the jet-pipe type. The operative connection between the gysoscope 27 and the relay 31 will become apparent from an inspection of Fig. 3 later to be described. The jet-pipe 31 controls the pressure inside reception orifices 32 and 33 communicating with a differential pressure responsive device shown as being a diaphragm 34 separating chambers 35 and 36.

Upon precession of the gyroscope causing a deflection of the jet-pipe 31 in counterclockwise direction, the pressure will be increased in chamber 36 until the jet-pipe is restored to its neutral position. The pressure differential created in the chambers 35 and 36 and conduits 37 and 38 connected thereto will thus become proportional to the precession force of the gyroscope 27 or, in other words, to the rate of pressure change inside the tank 10.

As the position of the piston 21 represents the magnitude of pressure inside the tank 10, the force of a spring adjusted by the piston will constitute a change of pressure impulse.

The change of pressure impulse and the rate of change impulse are both applied jointly to act on the control relay 39 controlling a piston 40 of a servo-motor 41 connected to operate the valve 13.

In the illustrated example the change of condition impulse represented by the tension of a spring 42 and the rate of change impulse represented by the force exerted by a diaphragm 43 acted upon by the differential pressure in conduits 37 and 38 is superposed to control the relay 39.

The normal pressure to be maintained inside the tank 10 may be set by means of a spring 44 acting on the relay 39.

The operation of the device is as follows:

A change of pressure inside the tank 10 reproduced as the position of the piston 21 will cause an impulse proportional to the change of pressure to be exerted on the relay 39 by means of the spring 42. If the rate of change of pressure is great, the precession force of the gyroscope 27 will be great causing the controlling impulse acting on the relay 39 to be increased, resulting in a wider opening of the butterfly valve 13 than in an instant where the rate of pressure change is small.

Figure 2:
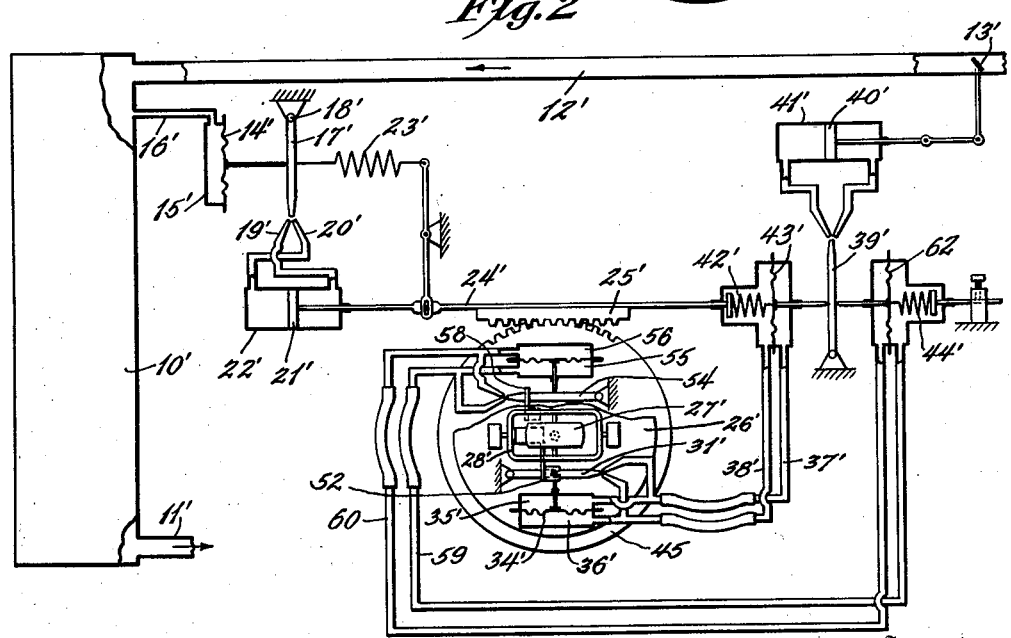
Fig. 2 is a diagrammatic illustration of a control apparatus utilizing two gyroscopic impulses.

In Fig. 2 a control apparatus is shown in which not only a change of condition impulse and a rate of change impulse is applied to correct the condition, but in which further a rate of rate of change impulse is introduced to control the position of the control member 13.

In this figure primed reference numerals are used to identify elements which correspond to the respective elements in Fig. 1.

The position of the rod 24' and the rack 25' are again a function of the magnitude of the condition. The control member 13' is operated by the servo-motor 41' and controlled by the relay 39'. The relay is acted upon by a condition change impulse represented by the tension of a spring 42' and further by a rate of change impulse derived from the gyroscope 27' causing a differential pressure to be set up in conduits 37' and 38' and acting on the diaphragm 43'.

The device for creating the gyroscopic impulse is shown in greater detail in Fig. 3.

A first or lower supporting disc 45 is shown as being supported by a vertical shaft 46 secured to its lower face and said shaft is journaled in a fixed anti-friction bearing support 47, which, in this instance, supports the entire gyroscope assembly. The disc 45 is shown as having teeth meshing with the rack 25'. A second or upper supporting disc 26' is shown as being supported on a vertical shaft 48 journaled in an upstanding supporting, anti-friction bearing 49 on the lower disc 45, the shaft being shown raised out of the bearing to show the anti-friction elements. If necessary, it will be understood that a suitable, upper, vertical, supporting bearing may be provided for the upper disc 26', ordinary bearing frames for this purpose being well known and requiring no illustration.

On the second support 26' there is mounted in bearings 29' and 30' the rotor bearing member 28', carrying the gyro rotor 27'. In order to dampen the oscillations of the rotor bearing member a dash-pot 50 connected between the support 26' and an arm 51 may be provided. The movements of the rotor bearing member 28 are applied to the jet-pipe 31' by means of an arm 52' engaging a pin 53 of the jet-pipe. The reception orifices 32' and 33' are connected to the chambers 35' and 36' divided by a diaphragm 34'. Conduits 37' and 38' are connected to the diaphragm chambers 35' and 36'.

As hereinbefore explained, the gyroscope will react to a rotary movement causing precession with a certain reaction force which is the first derivative with regard to time of the precession force.

For determining the magnitude of the reaction force a second relay is provided, also shown as being of the jet-pipe type. A jet-pipe 54 controlling the differential pressure in chambers 55 and 56 is pivotally mounted on a block 57 on the support 45 and acted upon by the second support by means of a bracket 58 engaging the jet-pipe. Conduits 59 and 60 are connected to the chambers 55 and 56 respectively. A dash-pot 61 may be provided for dampening the movements of the jet-pipe 54. Incidentally, Fig. 5 shows how the pivoted jet-pipes may be mounted in their bearing blocks. This figure happens to be a horizontal section through the bearing block for the jet-pipe 31'. It will be understood that the pressure fluid supply pipes leading to the jet-pipes have flexible hose portions or connections (not shown) to permit the necessary movements of the supports.

The operation of the torque responsive device is as follows:

A rotary movement imparted to the first support 45 is transmitted to the second support 26' by the bracket 58. As the gyroscope will resist the rotary movement with a certain reaction force, the jet-pipe 54 will be deflected and a differential pressure impulse be set up inside the chambers 55 and 56 and the conduits 59 and 60, respectively.

Returning now to Fig. 2, the differential pressure impulse in conduits 59 and 60 represents a rate of rate of change impulse and is applied to the controlling relay 39'. For this purpose, there is shown a further diaphragm 62 connected to act on the jet-pipe 39'. The controlling impulses derived from the change and rate of change are accordingly increased in proportion to the rate of rate of change of the condition.

In Fig. 4, another embodiment of this invention is shown. Double primed reference numerals refer to elements corresponding with those shown in Figs. 1 and 2. In this embodiment the controlling relay, the jet-pipe 39", is directly controlled by the diaphragm 14" responding to the condition changes. The relay controls the speed of a servo-motor 41" which in this embodiment is provided with a crank 63 operated by the piston 40" in order to derive a rotary movement from the servo-motor. Diaphragms 43" and 62" acted upon by differential pressure impulses representing the rate of change and the rate of rate of change are connected to act on the relay.

The supports 26" and 45" which are the same as those shown in Fig. 3 are diagrammatically shown in Fig. 4. On the crank shaft of the servo-motor is mounted a gear 64 meshing with a second gear 65 for rotating the supports. The operation of this device is as follows:

Upon a condition change the diaphragm 14" will actuate the relay 39" and the latter will cause the control member 13" and the gyroscopic device 26" and 45" to be moved. The reaction impulse will at once oppose the movement of the diaphragm 14" and the precession impulse only permit a relatively slow actuation of the control member 13", thereby eliminating "hunting" or "overshooting".

Obviously, the present invention is not restricted to the particular embodiments herein shown and described. Moreover, it is not indispensable that all the features of this invention be used conjointly since they may be employed advantageously in various combinations and subcombinations.

What is claimed is:

1. Control apparatus comprising, in combination, means responsive to a condition change; a gyroscope; means controlled by said condition responsive means for rotating the gyroscope to precess the same; and means controlled by the gyroscope for adjusting the condition.

2. Control apparatus comprising, in combination, means responsive to a condition change; a gyroscope; means controlled by said condition responsive means for rotating the gyroscope to precess the same; and means jointly controlled by said condition responsive means and said gyroscope for adjusting the condition.

3. Control apparatus comprising, in combination, means responsive to a condition change; a gyroscope; means controlled by said condition responsive means for rotating the gyroscope, whereby the gyroscope is caused to precess about a precessional axis and to exert a reaction torque about an axis at right angles to the precessional axis; and means jointly responsive to the precession force and the reaction force for adjusting the condition.

4. Control apparatus comprising, in combination, means responsive to a condition change; a gyroscope; means controlled by said condition responsive means for rotating the gyroscope, whereby the gyroscope is caused to precess about a precessional axis and to exert a reaction torque about an axis at right angles to the precessional axis; and means jointly controlled by said condition responsive means and responsive to the precession force and the reaction force for adjusting the condition.

5. Control apparatus comprising, in combination, means responsive to a condition change; a rotatable support; means controlled by said condition responsive means for rotating said support; a turn-responsive gyroscope mounted on said support to precess upon rotation of the same; a relay connected to be acted upon by said condition responsive means and by said gyroscope; and a servo-motor actuated by said relay.

6. Control apparatus comprising, in combination, means responsive to a condition change; a support rotatable about an axis; means controlled by said condition responsive means for rotating said support; a turn responsive gyroscope including a rotor bearing member mounted on said support for movement about a precession axis substantially at right angles to said support axis, and a rotor mounted on said member for spinning about an axis substantially at right angles to said support and precessional axes; a relay connected to be acted upon by said condition responsive means and said rotor bearing member to respond to the condition change and to the precessional action of the gyroscope; and a servo-motor actuated by said relay.

7. Control apparatus comprising, in combination, means responsive to a condition change; a support rotatable about an axis; means controlled by said condition responsive means for rotating said support; a turn responsive gyroscope including a rotor bearing member mounted on said support for movement about a precession axis substantially at right angles to said support axis, and a rotor mounted on said member for spinning about an axis substantially at right angles to said support and precessional axes; a relay connected to be acted upon by said condition responsive means and said gyroscope to jointly respond to the condition change, the precessional action of said gyroscope about the precession axis, and the reaction force about an axis perpendicular to the spin and precession axes; and a servo-motor controlled by said relay.

8. In a control apparatus a first support mounted for rotation about a vertical axis; a second support mounted on said first support for rotation with the same; a turn responsive gyroscope mounted on said second support to precess upon turning of the same; and means responsive to the reaction torque between said first and second supports upon turning of said first support.

9. Control apparatus comprising, in combination, a support mounted for rotation about a vertical axis; means for rotating said first support in response to a condition change; a second support mounted on said first support for rotation with the same; a turn responsive gyroscope mounted on said second support to precess upon turning of the same; means responsive to the reaction torque between said first and second supports upon turning of said first support; and means controlled by said torque responsive means for adjusting the condition.

10. Control apparatus comprising, in combination, a support mounted for rotation about a vertical axis; means for rotating said first support in response to a condition change; a second support mounted on said first support for rotation with the same; a turn responsive gyroscope mounted on said second support to precess upon turning of the same; means responsive to the precession force of said gyroscope; means responsive to the reaction torque between said first and second supports upon turning of said first support; and means jointly controlled by said precession force and said torque responsive means for adjusting the condition.

11. Control apparatus comprising, in combination, means responsive to a condition change; a first relay controlled by said condition responsive means; a first servo-motor connected to be actuated by said first relay; means for exerting a restoring action on said first relay in response to movements of said first servo-motor; a gyroscope; means operable by said first servo-motor for rotating said gyroscope to precess the same; a second relay responsive to the precessional action of said gyroscope; a third relay jointly controlled by said first and second relay; and a second servo-motor connected to be actuated by said third relay,whereby the movements of said second servo-motor become a function of the condition change and the rate of condition change.

12. Control apparatus comprising, in combination, means responsive to a condition change; a first relay controlled by said condition responsive means; a first servo-motor connected to be actuated by said first relay; means for exerting a restoring action on said first relay in response to movements of said first servo-motor; a gyroscope; means operable by said first servo-motor for rotating said gyroscope to precess the same; a second relay responsive to the precessional action of said gyroscope; a third relay controlled by said second relay and connected to be acted upon by said first servo-motor; and a second servo-motor connected to be actuated by said third relay.

13. Control apparatus comprising, in combination, means responsive to a condition change; a first relay controlled by said condition responsive means; a first servo-motor connected to be actuated by said first relay; means for exerting a restoring action on said first relay in response to movements of said first servo-motor; a first support connected to be rotated by said first servo-motor; a second support mounted for rotation with said first support; a turn responsive gyroscope mounted on said second support to precess upon turning of the same; a second relay responsive to the precession force of the gyroscope; a third relay responsive to the reaction torque between said first and second support upon turning of said first support; a fourth relay controlled by said second and third relay and connected to be acted upon by said first servo-motor; and a second servo-motor connected to be actuated by said fourth relay, whereby the movements of said second servo-motor become a function of the condition change, the rate of change, and the rate of rate of change.

14. Control apparatus comprising, in combination, means responsive to a condition change; a relay controlled by said condition responsive means; a servo-motor actuated by said relay and connected to adjust the condition; a gyroscope; means operable by the servo-motor for rotating said gyroscope to precess the same; and means responsive to the precessional force of said gyroscope and connected to act on said relay.

15. Control apparatus comprising, in combination, means responsive to a condition change; a relay controlled by said condition responsive means; a servo-motor actuated by said relay and connected to adjust the condition; a gyroscope; means operable by the servo-motor for rotating said gyroscope to precess the same; and means responsive to the reactional force of said gyroscope and connected to act on said relay.

16. Control apparatus comprising, in combination, means responsive to a condition change; a relay controlled by said condition responsive means; a servo-motor actuated by said relay and connected to adjust the condition; a gyroscope; means operable by the servo-motor for rotating said gyroscope to precess the same; means responsive to the precessional force of the gyroscope and connected to act on said relay; and means responsive to the reactional force of said gyroscope and connected to act on said relay.

HERBERT ZIEBOLZ.